Figure 1:
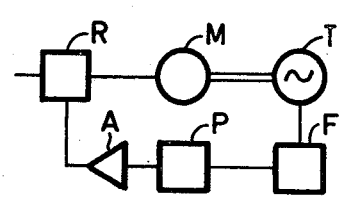

United States Patent

Janssen et al.

[11] 3,944,901
[45] Mar. 16, 1976

[54] CIRCUIT ARRANGEMENT FOR MAINTAINING THE SPEED OF A DC MOTOR CONSTANT

[75] Inventors: Peter Johannes Michiel Janssen; Petrus Josef Maria Aarts, both of Eindhoven, Netherlands

[73] Assignee: U.S. Philips Corporation, New York, N.Y.

[22] Filed: May 2, 1974

[21] Appl. No.: 466,221

[30] Foreign Application Priority Data
Jan. 26, 1974 Netherlands.................. 7401099

[52] U.S. Cl.................................. 318/318; 318/327
[51] Int. Cl.²........................................ H02P 5/06
[58] Field of Search........................... 318/318, 327

[56] References Cited
UNITED STATES PATENTS

| | | |
|---|---|---|
| 2,809,339 | 10/1957 | Guggi.................................. 318/327 |
| 3,233,163 | 2/1966 | Mishima............................. 318/327 |
| 3,599,063 | 8/1971 | Nanal.................................. 318/327 |
| 3,665,276 | 5/1972 | Fujii..................................... 318/318 |

*Primary Examiner*—B. Dobeck
*Attorney, Agent, or Firm*—Frank R. Trifari; Bernard Franzblau

[57] ABSTRACT

Circuit arrangement for stabilising the speed of a d.c. motor which is controlled via a control amplifier, and drives a tacho-meter which is connected between the bases of a "long-tailed pair," a tuned circuit being included between the collectors which is tuned to the tacho frequency and which attenuates the other frequencies, the voltage across the tuned circuit being applied to the control amplifier via a charge pump.

8 Claims, 5 Drawing Figures

U.S. Patent   March 16, 1976   3,944,901

CIRCUIT ARRANGEMENT FOR MAINTAINING THE SPEED OF A DC MOTOR CONSTANT

The invention relates to a circuit arrangement for maintaining the speed of a dc motor substantially constant, which arrangement includes a control amplifier connected in series with the motor winding, the motor driving a tacho-generator which supplies a voltage whose frequency is directly proportional to the speed of the tacho-generator, said voltage being fed via a filter to a rectifying circuit whose output is connected to the control input of the control amplifier.

Such an arrangement is known from German Patent application 1,463,417 which has been laid open for public inspection. In said arrangement the filter rejects the frequencies which are lower than the tacho-frequency at the desired speed, and transmits the other frequencies, after which a detector circuit converts them into a direct voltage which if fed to the control input of the control amplifier. If the speed is lower than the desired speed, the filter does not transmit the tacho-frequency and the motor receives the full current. Said arrangement more or less represents the electronic equivalent of an on-off switch, such as a centrifugal control device, and consequently it does not provide smooth control. Moreover, if the motor and tacho-generator form a compact combination, interference surges from the motor, for example, from the collector, may be transferred to the tacho-generator. These are pulse trains of a high frequency, for example greater than 10 MHz, but with a low repetition frequency of approximately 2 Hz relative to the tacho-frequency (for example 1800 Hz), which adversely affect the operation of the control circuit.

In order to avoid said drawbacks, the filter according to the invention is a tuned circuit whose resonant frequency substantially equals the tacho-frequency at the desired speed and attenuates the other frequencies. The output of the filter is connected to a capacitor charge pump which, in turn, is connected, via an amplifier, if necessary to the control input of the control amplifier.

In an embodiment of a circuit arrangement according to the invention the tacho-generator is connected to the bases of a long-tailed pair between the collectors of which a parallel resonant filter is included. The advantage of this arrangement is that the tacho-voltage overdrives the transistors of the long-tailed pair so that, independently of the tolerances of the tacho-voltage, the amplitude of the alternating voltage at the collectors of the long-tailed pair is constant and simultaneously the parallel resonant filter between said collectors drastically rejects the undesired interference components originating from the motor.

In a further embodiment of a circuit arrangement according to the invention a pulse shaper is included between the charge pump and the filter, the output of said pulse shaper leading to the charge pump.

In yet another embodiment of a circuit arrangement according to the invention the charge pump consists of a first capacitor which is connected to the pulse shaper and which leads to a series diode which is connected to a first electrode of a second capacitor, which via the series diode is charged by the pulses. The other electrode of the second capacitor is connected to an electrode of a parallel diode, whose other electrode is connected to the junction point of the first capacitor and the series diode. The unlike electrodes of the series and parallel diodes are interconnected.

If the charging time of the second capacitor is small relative to the pulse duration at the highest frequency which occurs, the voltage across the second capacitor is proportional to the frequency, and consequently is a measure of the departure from the desired speed. The use of diodes in said charge pump has the disadvantage of temperature dependence of the current through the diodes. In another embodiment of the circuit arrangement according to the invention this drawback is avoided in that the diodes are replaced by field-effect transistors, the control electrodes of the field effect transistors each being connected to opposite ends of the resonant circuit.

Figure 2:
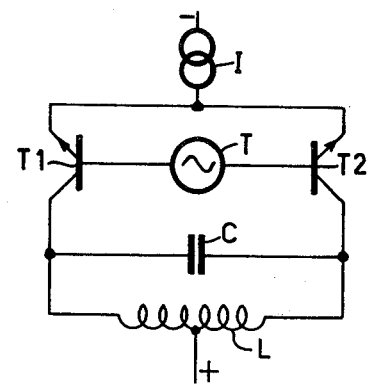
Figure 3:
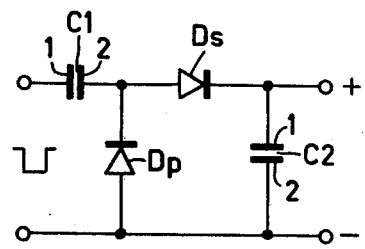
Figure 4:
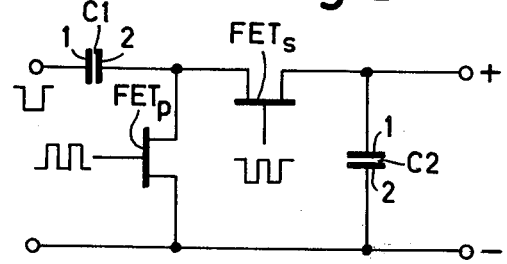
Figure 5:
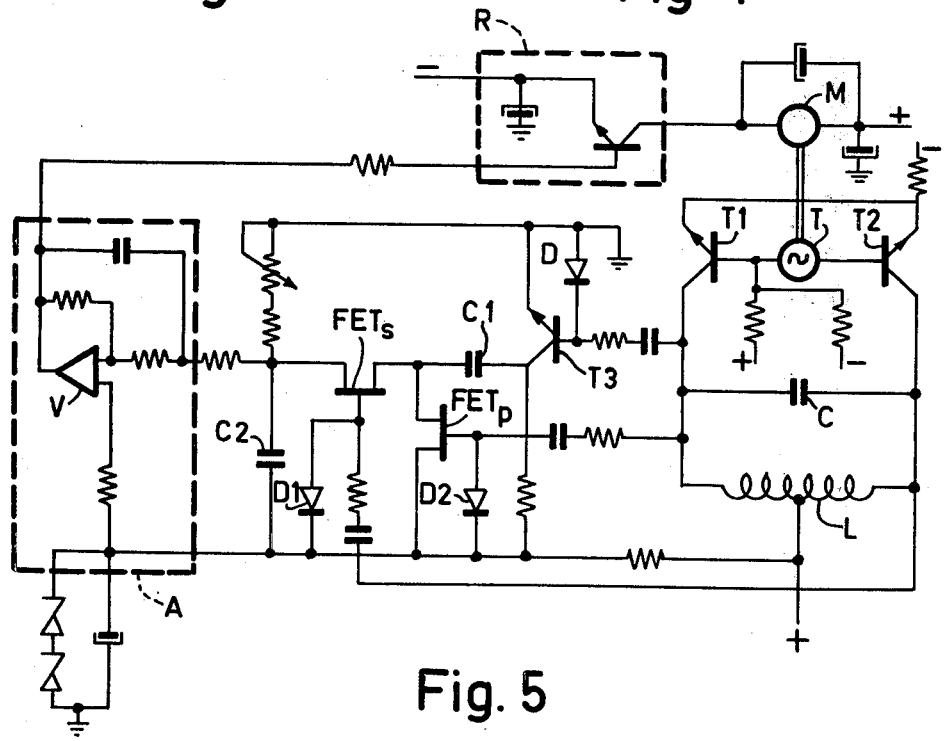

The invention will be further explained with the aid of the accompanying drawing and the following description, in which:

FIG. 1 is a block diagram of the circuit arrangement according to the invention, FIG. 2 shows the circuit arrangement of the resonant filter, FIG. 3 is a capacitor charge pump with diodes, FIG. 4 is a capacitor charge pump with FET's, and FIG. 5 shows the complete motor control circuit.

In FIG. 1 the motor M drives a tacho-generator T which supplies an alternating voltage whose frequency is directly proportional to the speed of the motor M. Said voltage is supplied to a filter F whose resonant frequency substantially equals the frequency of the tacho-generator voltage at a desired speed of the motor M. The filter, which has a voltage gain of approximately 5, transmits said frequency and strongly attenuates the other frequencies. As a result, the influence of the pulse trains which are transferred from the motor M to the tacho-generator T and which have a repetition rate of approximately 2 Hz and a pulse frequency greater than 10 MHz is reduced to harmless proportions.

The voltage from the filter F is applied to a charge pump P which provides an output voltage directly proportional to the frequency of the voltage at its input. Said output voltage of the charge pump P is amplified in the amplifier A, if necessary, and subsequently is fed to the control input of a control amplifier R which controls the supply of current to the motor M in such a way that said current decreases if the speed is too high and increases when the speed is too low.

The filter F may, for example, consist of a series resonant circuit in the supply line of the charge pump P or a parallel resonant circuit in parallel with the input of the charge pump P. In either case the voltage at the input of the charge pump is determined by the tacho-generator voltage which, of course, is subject to certain tolerances.

FIG. 2 shows a suitable circuit arrangement in which the output voltage or current is independent of the input voltage. The tacho-generator T is then included between the bases of a long-tailed pair consisting of transistors $T_1$ and $T_2$, the emitters of transistors $T_1$ and $T_2$ being fed from the current source I. The setting of the transistors $T_1$ and $T_2$ and the voltage of the tacho-generator T are selected so that the constant current from the current source I alternately flows through the transistor $T_1$ and through the transistor $T_2$, wherefor the peak currents in the collectors of the transistors $T_1$ and $T_2$ are independent of the peak voltage of the tacho-generator T. By including between the collectors of transistors $T_1$ and $T_2$ a parallel resonant filter F consisting of the inductance L and the capacitor C, which filter in a practical embodiment has a voltage gain of approximately 5 and a resonant frequency equal to the tacho-frequency at the desired speed of the motor M, the interference frequencies are strongly attenuated so that a substantially sinusoidal voltage of constant amplitude is obtained across the filter F because the circuit arrangement simultaneously acts as a limiter and as a filter.

FIG. 3 shows the circuit diagram of a charge pump. In this case it consists of a first capacitor $C_1$ to whose first electrode 1 an alternating voltage is applied and whose second electrode 2 leads to a series diode $D_s$ which is connected to a first electrode 1 of a second capacitor $C_2$. The capacitor $C_2$, via the series diode $D_s$, is charged by the rectified alternating current. The other electrode 2 of capacitor $C_2$ is connected to an electrode of a parallel diode $D_p$. The other electrode of diode $D_p$ leads to the connection point of the first capacitor $C_1$ and the series diode $D_s$. The unlike electrodes of series diode $D_p$ and parallel diode $D_s$ are interconnected.

If an alternating voltage is applied to the first electrode 1 of the first capacitor $C_1$, the second electrode 2 thereof will become negative relative to the anode of the parallel diode $D_p$ at a given instant during the first half of the negative part of the period. As a result said parallel diode $D_p$ becomes conductive and charges the first capacitor $C_1$ so that the second electrode 2 obtains a positive charge. In the second half of the negative part of the period the voltage at the first electrode 1 of the first capacitor $C_1$ increases again and that of the second electrode 2 initially also increases, so that the parallel diode $D_p$ is no longer conductive. When the voltage on the second electrode 2 of the first capacitor $C_1$ exceeds the sum of the threshold voltage of the series diode $D_s$ and the voltage at the first electrode 1 of the second capacitor $C_2$, the series diode $D_s$ becomes conductive and charge from the first capacitor $C_1$ is transferred to the second capacitor $C_2$ until the sum of the voltage at the first electrode 1 of the second capacitor $C_2$ and the threshold voltage of the series diode $D_s$ has become equal to that at the second electrode 2 of the first capacitor $C_1$, after which the series diode $D_s$ is turned off again. The current $i_1$ through the first capacitor $C_1$ equals the product of the frequency of the pulses and its charge Q, which charge in its turn depends on the capacitance of $C_1$ and consequently the charging voltage at the first electrode 1 of the first capacitor $C_1$ is a measure of the frequency of the tacho-generator.

As the threshold voltages of the series and parallel diodes $D_s$ and $D_p$ respectively are temperature dependent, the temperature will also affect the total charge of the second capacitor $C_2$ causing the stable speed of the motor to drift. Said temperature dependence can be avoided by replacing the diodes $D_s$ and $D_p$ by field-effect transistors such as $FET_s$ and $FET_p$ in FIG. 4. However, these transistors should be driven at the correct instants in order to make them conductive. This is achieved by driving the parallel field-effect transistor $FET_p$ by the voltage at the one side of the inductance L and the series field-effect transistor $FET_s$ by the voltage at the other side of the inductance L, which voltages are in phase opposition.

FIG. 5 shows a complete circuit diagram of an embodiment of a motor control arrangement according to the invention. The symbols used in this Figure are the same as those in the preceding Figures.

The motor M drives the tacho-generator T which is included in a circuit in accordance with FIG. 2. The collector of the transistor $T_1$ is coupled via an isolating capacitor to a pulse shaper consisting of transistor $T_3$. Across the base-emitter junction of transistor a diode D is connected in anti-parallel so that a pulse-shaped voltage is produced across its collector resistance. This latter voltage is fed to a charge pump as described with reference to FIG. 4, which pump consists of the first capacitor $C_1$, the second capacitor $C_2$, the series field-effect transistor $FET_s$ and the parallel field-effect transistor $FET_p$. The parallel field-effect transistor $FET_p$ is driven by the same voltage as the pulse shaper so that at the instant that it is conductive a pulse from the pulse shaper is available at the first electrode of $C_1$. The series field-effect transistor $FET_s$ is driven by a voltage in phase opposition therewith, which is derived from the collector of the transistor $T_2$. The output voltage is fed to an operational amplifier A biassed so that its output voltage, at the desired speed of the motor M, causes the control amplifier R to supply a current to the motor such that said desired speed is maintained. If for some reason the speed decreases, the voltage across the second capacitor $C_2$ decreases and the control amplifier allows some more current to pass until the original speed is restored. The reverse happens if the speed of the motor is too high. Diodes $D_1$ and $D_2$ serve to bias the control electrodes of the series field-effect transistor $FET_s$ and the parallel field-effect transistor $FET_p$.

The circuit arrangement allows the motor speed to remain constant with the tolerance of $10^{-4}$ within a temperature range of 20° to 70°C so that this circuit arrangement is perfectly suited for driving a turntable of a record player for audio as well as video records.

The motor in this control circuit may be any type of dc motor, even motors with series characteristics, because this control system can be very rigid, but preferably a motor with a shunt characteristic will be employed. The said motors may for example have a permanent-magnet field. They may also be brushless motors.

The tacho-generator coupled thereto may be of any type which supplies an alternating voltage or a modulated direct voltage in which the frequency is proportional to the speed.

What is claimed is:

1. A system for regulating the speed of a dc motor at a desired speed comprising, a control amplifier connected in series with the motor winding for controlling the current supplied to said winding, the motor driving a tacho-generator which supplies a voltage whose frequency is directly proportional to the speed of the tacho-generator, a filter comprising a tuned circuit having a resonant frequency equal to the tacho-generator frequency at the desired motor speed and which attenuates other frequencies, means for coupling the tacho-generator voltage via said filter to a charge pump rectifying circuit having an output connected to the control input of the control amplifier, said filter and charge pup rectifying circuit being responsive to the tacho-generator voltage to supply a DC control voltage to said control input of the control amplifier in a sense to maintain the motor at said desired speed.

2. A system as claimed in claim 1, further comprising first and second transistors connected in a long-tailed pair circuit configuration, means connecting the tacho-generator to the base electrodes of the transistors of said long-tailed pair circuit, and means connecting the parallel resonant filter between the collector electrodes of the long-tailed pair transistors.

3. A system as claimed in claim 1 further comprising a pulse shaper connected between the charge pump and the filter.

4. A system as claimed in claim 1 wherein the charge pump comprises a first capacitor connected to the output of the pulse shaper and to a series diode which is in turn connected to a first electrode of a second capacitor, means connecting the other electrode of the second capacitor to an electrode of a parallel diode, and means connecting the other electrode of the parallel diode to the connection point between the first capacitor and the series diode with the unlike electrodes of the series and parallel diodes being interconnected.

5. A system as claimed in claim 1, wherein the charge pump circuit comprises a first capacitor and a first field-effect transistor connected in series between an input and an output terminal of the charge pump circuit, a second field-effect transistor connected between a common terminal and the junction between the first capacitor and the first field-effect transistor, a second capacitor connected between said output terminal and said common terminal, and means connecting the control electrodes of the field-effect transistors to opposite ends of the filter resonant circuit.

6. An electrical system for regulating the speed of a motor comprising, a voltage generator coupled to a drive shaft of the motor for generating a voltage whose frequency is proportional to the motor speed, a control amplifier coupled to the motor to control the current supplied to the motor from an electric energy source, a filter comprising a resonant circuit tuned to the frequency of the voltage generator output voltage corresponding to the desired speed of the motor, a capacitor charge pump circuit for converting the frequency of an input signal into a corresponding DC voltage that is independent of the amplitude of the input signal, first means for coupling the output of the voltage generator to the input of the charge pump circuit via said filter, said filter being operative to transmit a signal at its resonant frequency to the charge pump input and to attenuate all other signal frequencies, and second means for coupling the output of the charge pump circuit to a control terminal of the control amplifier to apply a control voltage thereto in a sense to maintain the motor at the desired speed.

7. A regulating system as claimed in claim 6 wherein said first coupling means comprises first and second transistors connected in a long-tailed pair circuit arrangement with the transistor control electrodes connected to respective terminals of the voltage generator and the transistor output electrodes connected to the filter.

8. A regulating system as claimed in claim 6 wherein the charge pump circuit comprises, a first capacitor and a first diode connected in series between an input and output terminal of the charge pump, a second capacitor connected between said output terminal and a common terminal, and a second diode connected between said common terminal and the junction point between the first capacitor and the first diode, said diodes being poled so that unlike electrodes are joined together at said junction point.

\* \* \* \* \*